US012670108B2

(12) United States Patent
Moshe et al.

(10) Patent No.:   US 12,670,108 B2
(45) Date of Patent:        Jun. 30, 2026

(54) SYSTEM AND METHOD FOR LOW LATENCY PACKET PROCESSING

(71) Applicant: Mellanox Technologies, Ltd., Yokneam (IL)

(72) Inventors: Ortal Ben Moshe, Ein HaEmek (IL); Roee Moyal, Yoqneam Ilit (IL); Shay Aisman, Zichron Ya'acov (IL); Gil Bloch, Zichron Ya'acov (IL); Ariel Shahar, Jerusalem (IL); Roman Nudelman, Kiryat Bialik (IL); Gil Kremer, Hadera (IL); Yossef Itigin, Hod Hasharon (IL); Lior Narkis, Petah Tikva (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 18/224,262

(22) Filed: Jul. 20, 2023

(65) Prior Publication Data

US 2025/0028658 A1      Jan. 23, 2025

(51) Int. Cl.
*G06F 13/16* (2006.01)
*G06F 9/54* (2006.01)

(52) U.S. Cl.
CPC .......... *G06F 13/1642* (2013.01); *G06F 9/546* (2013.01); *G06F 13/1621* (2013.01)

(58) Field of Classification Search
None
See application file for complete search history.

(56) References Cited

U.S. PATENT DOCUMENTS

| | | | |
|---|---|---|---|
| 11,350,189 B2 | 5/2022 | Bakopoulos et al. | |
| 11,372,782 B2 * | 6/2022 | Kim | G06F 13/404 |
| 11,409,685 B1 * | 8/2022 | Kaplan | H04L 67/1095 |
| 11,711,318 B1 | 7/2023 | Patronas et al. | |
| 2003/0182464 A1 * | 9/2003 | Hamilton | G06F 9/546 |
| | | | 709/213 |
| 2004/0034718 A1 * | 2/2004 | Goldenberg | H04L 69/12 |
| | | | 709/250 |

(Continued)

OTHER PUBLICATIONS

Patronas et al., Pending U.S. Appl. No. 17/948,930, filed Sep. 20, 2022.

(Continued)

*Primary Examiner* — Henry Tsai
*Assistant Examiner* — Christopher A Bartels
(74) *Attorney, Agent, or Firm* — ALSTON & BIRD LLP

(57)                ABSTRACT

Systems and methods are described herein for processing data packets. An example network adapter may include a network interface operatively coupled to a communication network and a packet processing circuitry operatively coupled to the network interface. The packet processing circuitry may receive, via the network interface, a message; retrieve, via a packet processing circuitry, a work queue element (WQE) index identifying a position of a WQE in a receive queue; determine that the message is associated with a small payload; process the message without consuming the WQE; receive, via the network interface, a subsequent message; and process the subsequent message using the WQE. In this way, the systems and methods describe herein reduce the latency in processing of the data packets.

18 Claims, 2 Drawing Sheets

200

RECEIVING, VIA A NETWORK INTERFACE, A MESSAGE
202

RETRIEVING A WORK QUEUE ELEMENT (WQE) INDEX IDENTIFYING A POSITION OF A WQE IN A RECEIVE QUEUE
204

DETERMINING, VIA THE PACKET PROCESSING CIRCUITRY, THAT THE MESSAGE IS ASSOCIATED WITH A SMALL PAYLOAD
206

PROCESSING, VIA THE PACKET PROCESSING CIRCUITRY, THE MESSAGE WITHOUT CONSUMING THE WQE IDENTIFIED BY THE WQE INDEX
208

RECEIVING, VIA THE NETWORK INTERFACE, A SUBSEQUENT MESSAGE
210

PROCESSING, VIA THE PACKET PROCESSING CIRCUITRY THE SUBSEQUENT MESSAGE USING THE WQE
212

(56)                References Cited

U.S. PATENT DOCUMENTS

| | | | |
|---|---|---|---|
| 2005/0220128 A1* | 10/2005 | Tucker | H04L 49/901 |
| | | | 370/412 |
| 2009/0254647 A1* | 10/2009 | Elzur | H04L 67/1097 |
| | | | 709/223 |
| 2015/0242324 A1* | 8/2015 | Novakovic | G06F 12/0813 |
| | | | 711/121 |
| 2017/0187621 A1* | 6/2017 | Shalev | H04L 45/745 |
| 2018/0052803 A1* | 2/2018 | Graham | H04L 49/355 |
| 2018/0063016 A1* | 3/2018 | Gulati | G06F 9/546 |
| 2018/0293101 A1* | 10/2018 | Park | G06F 9/546 |
| 2018/0365176 A1* | 12/2018 | Finkelstein | H04L 47/34 |
| 2019/0034381 A1* | 1/2019 | Burstein | H04L 67/1097 |
| 2019/0347125 A1* | 11/2019 | Sankaran | G06F 9/30181 |
| 2022/0283973 A1 | 9/2022 | Levi et al. | |
| 2022/0345417 A1* | 10/2022 | Kasichainula | H04L 47/30 |
| 2023/0012707 A1* | 1/2023 | Shetty | G06F 13/1626 |
| 2024/0015109 A1* | 1/2024 | Markovitz | H04L 49/901 |
| 2024/0146664 A1* | 5/2024 | Yefet | H04L 47/6225 |
| 2025/0023668 A1* | 1/2025 | Moyal | H04L 1/1621 |

OTHER PUBLICATIONS

Weiner et al., Pending U.S. Appl. No. 17/875,999, filed Jul. 28, 2022.
Friedman et al., Pending U.S. Appl. No. 17/902,150, filed Sep. 2, 2022.

* cited by examiner

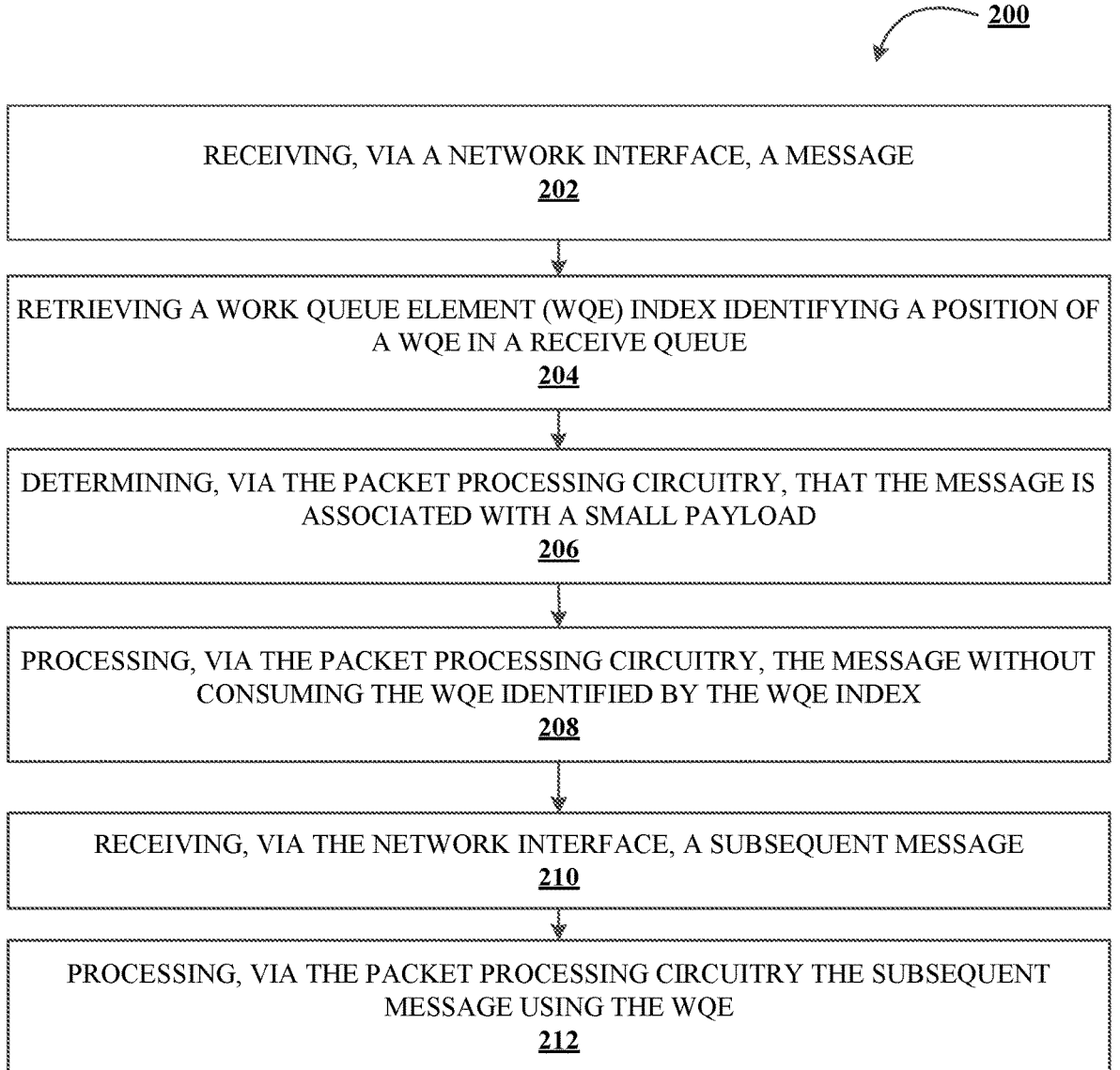

200

RECEIVING, VIA A NETWORK INTERFACE, A MESSAGE
202

RETRIEVING A WORK QUEUE ELEMENT (WQE) INDEX IDENTIFYING A POSITION OF
A WQE IN A RECEIVE QUEUE
204

DETERMINING, VIA THE PACKET PROCESSING CIRCUITRY, THAT THE MESSAGE IS
ASSOCIATED WITH A SMALL PAYLOAD
206

PROCESSING, VIA THE PACKET PROCESSING CIRCUITRY, THE MESSAGE WITHOUT
CONSUMING THE WQE IDENTIFIED BY THE WQE INDEX
208

RECEIVING, VIA THE NETWORK INTERFACE, A SUBSEQUENT MESSAGE
210

PROCESSING, VIA THE PACKET PROCESSING CIRCUITRY THE SUBSEQUENT
MESSAGE USING THE WQE
212

FIG. 2

SYSTEM AND METHOD FOR LOW LATENCY PACKET PROCESSING

TECHNOLOGICAL FIELD

Embodiments of the present disclosure relate generally to data communications, and specifically to devices for interfacing between a computing device and a packet data network.

BACKGROUND

InfiniBand (IB) is a high-speed interconnect technology commonly used in high-performance computing (HPC) and data center environments. Computing devices (host processors and peripherals) connect to the IB fabric via a network adapter. To send and receive messages over the network, the network adapter may employ work items, called work queue elements (WQEs), regardless of the size and type of the message.

Applicant has identified a number of deficiencies and problems associated with processing data packets in HPC data center environments due to the size and type of message. Many of these identified problems have been solved by developing solutions that are included in embodiments of the present disclosure, many examples of which are described in detail herein.

BRIEF SUMMARY

Systems, methods, and computer program products are provided for low latency packet processing.

In one aspect, a network adapter is presented. The network adapter comprises a network interface operatively coupled to a communication network; packet processing circuitry operatively coupled to the network interface, wherein the packet processing circuitry is configured to: receive, via the network interface, a message; retrieve a work queue element (WQE) index identifying a position of a WQE in a receive queue; determine that the message is associated with a small payload; process the message without consuming the WQE; receive, via the network interface, a subsequent message; and process the subsequent message using the WQE.

In some embodiments, the subsequent message is not associated with a small payload.

In some embodiments, the small payload comprises a data payload that does not require writing to one or more memory indices associated with a memory.

In some embodiments, the packet processing circuitry is further configured to: write the message to a completion notification indicating that the message has been processed.

In some embodiments, the packet processing circuitry is further configured to: determine a receive queue state associated with the receive queue prior to receiving the message; and maintain the receive queue state in response to processing the message.

In some embodiments, the message comprises an immediate message.

In another aspect, a method for processing data packets is presented. The method comprising: receiving, via a network interface, a message; retrieving a work queue element (WQE) index identifying a position of a WQE in a receive queue; determining, via a packet processing circuitry, that the message is associated with a small payload; processing, via the packet processing circuitry, the message without consuming the WQE; receiving, via the network interface, a subsequent message; and processing, via the packet processing circuitry the subsequent message using the WQE.

In yet another aspect, a computer program product for processing data packets is presented. The computer program product comprising a non-transitory computer-readable medium comprising code configured to cause an apparatus to: receive, via a network interface, a message; retrieve, via a packet processing circuitry, a work queue element (WQE) index identifying a position of a WQE in a receive queue; determine that the message is associated with a small payload; process, via the packet processing circuitry, the message without consuming the WQE; receive, via a network interface, a subsequent message; and process, via the packet processing circuitry, the subsequent message using the WQE.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Figure 1:
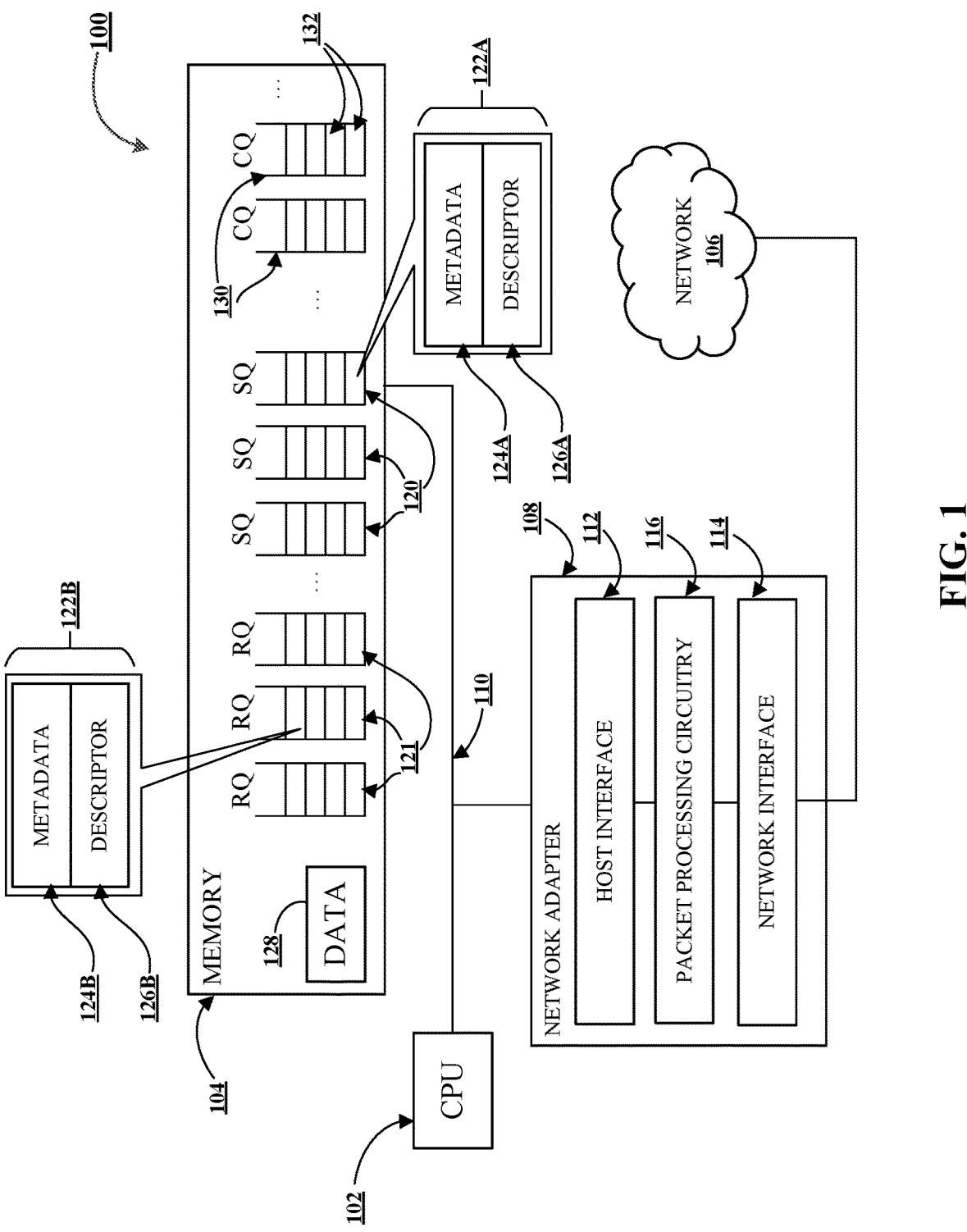

Having thus described embodiments of the disclosure in general terms, reference will now be made to the accompanying drawings. The components illustrated in the figures may or may not be present in certain embodiments described herein. Some embodiments may include fewer (or more) components than those shown in the figures.

FIG. 1 illustrates an example data communication system, in accordance with an embodiment of the present invention; and FIG. 2 illustrates a method for low latency packet processing, in accordance with an embodiment of the present invention.

DETAILED DESCRIPTION

Overview

InfiniBand (IB) is a high-speed interconnect technology commonly used in high-performance computing (HPC) and data center environments. Computing devices (host processors and peripherals) connect to the IB fabric via a network adapter, which is referred to in IB parlance as a channel adapter. Host processors (or hosts) use a host channel adapter (HCA), while peripheral devices use a target channel adapter (TCA) for connecting to the IB fabric.

Client processes running on a host processor, such as software application processes, communicate with the transport layer of the IB fabric by manipulating a transport service instance, known as a "queue pair" (QP), made up of a send work queue and a receive work queue (often referred to simply as a send queue and a receive queue). To send and receive messages over the network using the network adapter, the client may initiate work requests (WRs), which causes the driver program to place work items, called work queue elements (WQEs), in the appropriate work queues (e.g., the send queue or the receive queue). For example, when a network adapter needs to receive a message, it posts a receive description by creating a WQE and then adding the WQE to a receive queue (e.g., a shared receive queue (SRQ)). In the receive queue each WQE may include processing parameters such as a memory descriptor, a pointer to the location in memory where each message is to be scattered, and metadata that may be used in assembling the data packets across which the message is contained. For each WQE that is processed, a completion notification (e.g., a completion queue element (CQE)) may be generated indicating that the message has been processed according to the processing parameters. Once the CQE is published, the WQE is considered "consumed," and the software layer is expected to repost another WQE into the receive queue to receive another message. In some cases, a single WQE (e.g., a receive WQE) may be used multiple times for receiving/ scattering multiple data packets or messages before it is considered "consumed."

In some cases, depending on the size and type of the payload associated with the message, the data packets may not require scattering to the memory (which may, for example, be buffers specified by the WQE). An example of such a message is immediate data. Immediate data is typi- cally a small piece of information (e.g., 32 bits or less) that is sent to the receiver along with the message to provide additional context or to signal completion of an operation. When a sender initiates a send operation with a message that has a small payload, the message is included in the WQE and transmitted along with the message. Upon completion of the operation, the message is extracted by the receiver and made available in the corresponding CQE. In some embodiments, the configuration of the communication network (e.g., con- nection) may determine whether the message is made avail- able in the corresponding CQE once processed. Because message is not scattered to the data region of the memory, there is no need for the message to consume a WQE before being made available in a CQE. Processing such WQEs (which can be arranged in the receive queue with a link-list structure) can contaminate device caches and add latency in processing of the data packets.

Embodiments of the invention identify messages that do not require scattering to the data region of the memory (e.g., buffers specified by the WQE) and process such messages without requiring them to consume a WQE. In doing so, embodiments of the invention may maintain the state of the receive queue without any changes and can use the same WQE for a subsequent incoming message. In addition, the driver program may be notified that the WQE remains unused and that a new WQE need not be issued to process the subsequent incoming message.

Although the above terminology and some of the embodi- ments in the description that follows are based on features of the IB architecture and use vocabulary taken from IB specifications, similar mechanisms exist in networks and I/O devices that operate in accordance with other protocols, such as Ethernet and Fiber Channel. The IB terminology and features are used herein by way of example, for the sake of convenience and clarity, and not by way of limitation.

Embodiments of the present invention will now be described more fully hereinafter with reference to the accompanying drawings, in which some, but not all, embodiments are shown. Indeed, the present disclosure may be embodied in many different forms and should not be construed as limited to the embodiments set forth herein; rather, these embodiments are provided so that this disclo- sure will satisfy applicable legal requirements. Where pos- sible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, "operatively coupled" may refer to the functional connection between network components to facilitate the transmission of data packets between the connected components, ensuring that they are transmitted, received, and/or processed accurately and in a timely man- ner. This connection may be achieved through direct or indirect means, such as physical wiring, wireless commu- nication, intermediary devices, software-based protocols, and/or the like, and may incorporate mechanisms for han- dling data packet transmission, including routing, error detection, and flow control. It should also be understood that "operatively coupled," as used herein, means that the com- ponents may be formed integrally with each other, or may be formed separately and coupled together. Furthermore, "operatively coupled" means that the components may be formed directly to each other, or to each other with one or more components located between the components that are operatively coupled together. In addition, "operatively coupled" may mean that the components are detachable from each other, or that they are permanently coupled together. Moreover, "operatively coupled" may mean that components may be electronically connected and/or in fluid communication with one another.

As used herein, "data," "content," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein as receiving data from another computing device, it will be appreciated that the data may be received directly from another computing device or may be received indirectly via one or more intermediary computing devices, such as, for example, one or more servers, relays, routers, network access points, base stations, hosts, and/or the like, some- times referred to herein as a "network." Similarly, where a computing device is described herein as sending data to another computing device, it will be appreciated that the data may be sent directly to another computing device or may be sent indirectly via one or more intermediary computing devices, such as, for example, one or more servers, relays, routers, network access points, base stations, hosts, and/or the like.

As used herein, "illustrative," "exemplary," and "example" are not provided to convey any qualitative assessment, but instead merely to convey an illustration of an example. Thus, use of any such terms should not be taken to limit the spirit and scope of embodiments of the present invention.

As used herein, "in one embodiment," "according to one embodiment," "in some embodiments," and/or the like gen- erally mean that the particular feature, structure, or charac- teristic following the phrase may be included in at least one embodiment of the present disclosure and may be included in more than one embodiment of the present disclosure (importantly, such phrases do not necessarily refer to the same embodiment).

Example Data Communication System

FIG. 1 illustrates a data communication system 100, in accordance with an embodiment of the present invention. As shown in FIG. 1, the data communication system 100 may include a host processor, in the form of a central processing unit (CPU) 102, and a host memory 104 (also referred to as a system memory), which are connected to a suitable bus 110, such as a PCI Express® (PCIe) bus, as is known in the art. CPU 102 may include multiple processing cores (not shown) and may perform the functions described herein under the control of program instructions in software. This software may be downloaded to system 100 in electronic form, over a network, for example. Additionally or alternatively, the software may be stored in tangible, non-transitory computer-readable memory media, such as optical, magnetic, or electronic memory.

A network adapter 108, such as an IB host channel adapter (HCA), may connect the data communication system 100 to a network 106. The network adapter 108 may include a network interface 114 coupled to the network 106, and a host interface 112 coupled to the CPU 102 and memory 104 via a bus 110. Packet processing circuitry 116, coupled between the network interface 114 and the host interface 112, may generate outgoing packets for transmission over the network 106, as described below and may also process incoming packets received from the network. The host interface 112, the network interface 114, and the packet processing circuitry 116 may typically include dedicated hardware logic, the details of which will be apparent to those skilled in the art after reading the present description. Alternatively or additionally, at least some of the functions of the packet processing circuitry 116 may be implemented in software on a suitable programmable processor.

In some embodiments, client processes running on the CPU 102 may communicate with peers (e.g., a source host) over the network 106 by means of queue pairs (QPs) via the network adapter 108. Each QP may include a send work queue and a receive work queue. To send messages over the network 106 using the network adapter 108, client processes running on the CPU 102, such as processes generated by application software, may submit work requests for execution by the network adapter 108. The work requests may specify a message to be transmitted by means of a pointer to the location of a buffer in a data region 128 of the memory 104. A driver program running on the CPU 102 may process the work requests to generate WQEs 122A and place the WQEs 122A in send queues (SQ) 120 in the memory 104, as shown in FIG. 1. Each WQE 122A may include metadata 124A, such as addressing and protocol information, to be used by the network adapter 108 in constructing packet headers and transmitting the corresponding packet or packets. In addition, each WQE 122A may include a descriptor 126A indicating the actual message to be contained in the packet payloads. The descriptor 126A may contain a pointer to the appropriate buffer in the data region 128 of the memory 104. Alternatively, for inline WQEs where the actual message is stored within the WQE 122A itself, the driver program may copy the message from the data region 128 directly into the descriptor 126A, so that WQE 122A may include the actual message rather than a pointer to the message. As noted above and described further hereinbelow, the driver program may be able to decide dynamically and automatically, under control of software, when to generate inline WQEs 122A and when to use pointer-based WQEs. To this end, the driver program may set a flag in the WQE 122A (typically a single bit) to indicate whether the data following that bit comprise a pointer or the actual inline data.

In some embodiments, the network adapter 108 may read WQEs 122A from the appropriate queues by means of direct memory access (DMA) transactions on the bus 110, which may be carried out by the host interface 112. The packet processing circuitry 116 may parse the WQEs 122A and, specifically, determine whether each WQE 122A is of the pointer-based or inline type. In the former case, the host interface 112 may perform a further bus transaction to read the message from the location indicated by the pointer in the memory 104. In the latter case, when the WQE 122A is of the inline type, this additional bus transaction may not be required. The packet processing circuitry 116 may then construct one or more packets containing the message and transmit the packets via the network interface 114 to the network 106.

Upon completing execution of a WQE 122A, packet processing circuitry 116 may write a completion report, such as a completion queue element (CQE) 132, to a designated completion queue (CQ) 130 in the memory 104. Depending on the reliability requirements of the transport protocol, the packet processing circuitry 116 may write the CQE 132 immediately after sending the message called for by the WQE 122A, or it may wait until an acknowledgment has been received from the message destination. Client processes running on the CPU 102 may read the CQEs 132 from their assigned CQs 130 and may thus be able to ascertain that their work requests have been fulfilled.

To receive messages over the network 106 using the network adapter 108, the driver program running on the CPU 102 may prepare for incoming messages by posting receive work requests. These work requests are processed to generate WQEs 122B, which are then placed in appropriate receive queues 121. Each WQE 122B may include metadata 124B, such as addressing and protocol information, to be used by the network adapter 108 in interpreting packet headers and reassembling the corresponding packet or packets. In addition, each WQE 122B may include a descriptor 126B pointing to the location in memory (e.g., memory indices) where the incoming message is to be stored. When the network adapter 108 detects an incoming message, it may read the WQEs 122B from the receive queue 121 using DMA transactions on the bus 110, which may be carried out by the host interface 112. The packet processing circuitry 116 may parse the received packets and use the information in the WQEs 122B to determine the appropriate location in the data region 128 of the memory 104 for storing the incoming message. If the WQE 122B contains a pointer, the host interface 112 performs a bus transaction to write the incoming message to the location indicated by the pointer in the memory 104. The packet processing circuitry 116 may also generate a CQE 132 indicating that the message has been received and processed according to the parameters specified in the WQE 122B.

Once the CQE 132 is published, the WQE 122B is considered "consumed," and the driver program running on the CPU 102 is expected to repost another WQE 122B into the receive queue 121 to prepare for receiving another message. This ensures that the network adapter 108 is ready to receive and process new incoming messages over the network 106.

Example Method for Low Latency Packet Processing

FIG. 2 illustrates a method for low latency packet processing 200, in accordance with an embodiment of the present invention. As shown in block 202, the method may include receiving, via the network interface, a message. In some embodiments, the network adapter (e.g., the network adapter 108 shown in FIG. 1) may receive the message from a source host. Typically, the source host, when creating a message to be sent, may split the message into smaller units called data packets. These data packets may then be encapsulated with appropriate headers, such as a transport layer header that may include information such as destination QP and other control data. Once prepared, the source host may then transmit the data packets to the network adapter via the network (e.g., the network 106 shown in FIG. 1).

As shown in block 204, the method may include retrieving a work queue element (WQE) index identifying a position of a WQE in a receive queue. As described herein, in response to receiving a message, the network adapter typically selects the next available WQE from the receive queue (e.g., using DMA transactions) by monitoring the head pointer of the receive queue. The head pointer may be a dynamic reference that indicates the position of the next WQE to be processed in the receive queue. The WQE index of the selected WQE may be used to link the message with the WQE, ensuring that the message is placed in the correct buffer location and managed properly.

As shown in block 206, the method may include determining that the message is associated with a small payload. In some embodiments, a small payload may refer to a data payload of a size that is 32 bytes or less, that does not require writing to one or more memory indices associated with a memory.

As shown in block 208, the method may include processing the message without consuming the WQE. When processing messages, WQEs, in part, identify specific memory indices or buffers to which the message should be scattered. If the message does not require scattering to the memory, the use of the WQE can be bypassed, and the message may be processed without consuming the WQE that is identified by the WQE index. What is more, in response to determining that the message is associated with a small payload, the network adapter is configured to not even read the WQE in the receive queue. In response to processing the message, the network adapter may generate or publish a CQE indicating that the message has been processed.

Typically, there is a logical flow between WQEs and CQEs when processing messages. To process a message, the network adapter may use a WQE and may perform the requested operation, such as transmitting or receiving data or performing RDMA operations. Upon completion of the operation, the network adapter may generate a CQE that contains information about the completed operation, such as the Work Request ID (which is typically used to correlate the CQE with the original WQE), the operation status, and any additional flags or information. Then, the network adapter may place the CQE in the appropriate CQ and generate an event or interrupt to notify the system that a new completion entry is available. When a WQE is used to process each message, and the CQE is generated indicating that the message has been processed, there is a logical flow that correlates the WQE and the CQE. By processing the message without using the WQE, while still generating the CQE, the correlation between the WQE and the CQE is uncoupled. By uncoupling the correlation between the WQE and the CQE, the queue state associated with the receive queue prior to receiving the message is maintained even after the message is processed as the WQE that was initially intended for the message is now being used to process a subsequent message. In some embodiments, the CQE may include a flag or information therewithin that indicates that a WQE was not used for the completed work request. This information allows the driver program to determine that there is no need to repost a new WQE in response to this specific CQE. In other words, the driver program can efficiently manage its resources without unnecessarily allocating new WQEs when they are not needed, based on the information provided in the CQE.

As shown in block 210, the method may include receiving, via the network interface, a subsequent message. In some embodiments, the subsequent message may not be associated with a small payload. For example, the subsequent message may be associated with a data payload that may require scattering to the one or more memory indices associated with the memory. In embodiments where the subsequent message is also associated with a small payload, the subsequent message is processed similar to the message, i.e., without consuming a WQE. As such, the subsequent message may refer to any later-received message that is not associated with a small payload.

As shown in block 212, the method may include processing the subsequent message using the WQE. As described herein, because the WQE that was initially intended to process the message was not used to process the message, the WQE may be used to process the subsequent message.

Embodiments of the present disclosure are described below with reference to block diagrams and flowchart illustrations. Thus, it should be understood that each block of the block diagrams and flowchart illustrations may be implemented in the form of a computer program product; an entirely hardware embodiment; an entirely firmware embodiment; a combination of hardware, computer program products, and/or firmware; and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Many modifications and other embodiments of the inventions set forth herein will come to mind to one skilled in the art to which these inventions pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

INCORPORATION BY REFERENCE

To supplement the present disclosure, this application further incorporates entirely by reference the following commonly assigned patent applications:

| Docket Number | U.S. patent application Ser. No. | Title | Filed On |
|---|---|---|---|
| 048833.000121 | To be assigned | STRIDED MESSAGE BASED RECEIVE BUFFER | Filed Concurrently Herewith |

What is claimed is:

1. A network adapter, comprising:

a network interface operatively coupled to a communication network;

packet processing circuitry operatively coupled to the network interface, wherein the packet processing circuitry is configured to:

receive, via the network interface, a message;

retrieve a work queue element (WQE) index identifying a position of an inline WQE in a receive queue;

determine that the message is associated with a small payload that does not require writing to one or more memory indices associated with a memory;

process the message without consuming the WQE;

generate a completion queue element (CQE) indicating that the message was processed without consuming the WQE, thereby uncoupling a correlation between the WQE and the CQE;

receive, via the network interface, a subsequent message; and process the subsequent message using the WQE.

2. The network adapter of claim 1, wherein the subsequent message is not associated with a small payload.

3. The network adapter of claim 1, wherein the packet processing circuitry is further configured to:

write the message to a completion notification indicating that the message has been processed.

4. The network adapter of claim 1, wherein the packet processing circuitry is further configured to:

determine a receive queue state associated with the receive queue prior to receiving the message; and maintain the receive queue state in response to processing the message.

5. The network adapter of claim 1, wherein the message comprises an immediate message.

6. The network adapter of claim 1, wherein, in generating the CQE, the packet processing circuitry is further configured to:

transmit, to a driver program, a notification comprising instructions to not post a new WQE in the receive queue.

7. A method for processing data packets, the method comprising:

receiving, via a network interface, a message;

retrieving a work queue element (WQE) index identifying a position of an inline WQE in a receive queue;

determining, via a packet processing circuitry, that the message is associated with a small payload that does not require writing to one or more memory indices associated with a memory;

processing, via the packet processing circuitry, the message without consuming the WQE;

generating, via the packet processing circuitry, a completion queue element (CQE) indicating that the message was processed without consuming the WQE, thereby uncoupling a correlation between the WQE and the CQE;

receiving, via the network interface, a subsequent message; and processing, via the packet processing circuitry, the subsequent message using the WQE.

8. The method of claim 7, wherein the subsequent message is not associated with a small payload.

9. The method of claim 7, wherein the method further comprises writing the message to a completion notification indicating that the message has been processed.

10. The method of claim 7, wherein the method further comprises:

determining a receive queue state associated with the receive queue prior to receiving the message; and maintaining the receive queue state in response to processing the message.

11. The method of claim 7, wherein the message comprises an immediate message.

12. The method of claim 7, wherein generating the CQE further comprises transmitting, to a driver program, a notification comprising instructions to not post a new WQE in the receive queue.

13. A computer program product for processing data packets, the computer program product comprising a non-transitory computer-readable medium comprising code configured to cause an apparatus to:

receive, via a network interface, a message;

retrieve, via a packet processing circuitry, a work queue element (WQE) index identifying a position of an inline WQE in a receive queue;

determine that the message is associated with a small payload that does not require writing to one or more memory indices associated with a memory;

process, via the packet processing circuitry, the message without consuming the WQE;

generate, via the packet processing circuitry, a completion queue element (CQE) indicating that the message was processed without consuming the WQE, thereby uncoupling a correlation between the WQE and the CQE;

receive, via a network interface, a subsequent message; and process, via the packet processing circuitry, the subsequent message using the WQE.

14. The computer program product of claim 13, wherein the subsequent message is not associated with a small payload.

15. The computer program product of claim 13, wherein the code is further configured to cause the apparatus to:

write the message to a completion notification indicating that the message has been processed.

16. The computer program product of claim 13, wherein the code is further configured to cause the apparatus to:

determine a receive queue state associated with the receive queue prior to receiving the message; and maintain the receive queue state in response to processing the message.

17. The computer program product of claim 13, wherein the message comprises an immediate message.

18. The computer program product of claim 13, wherein, in generating the CQE, the code is further configured to cause the apparatus to:

transmit, to a driver program, a notification comprising instructions to not post a new WQE in the receive queue.

* * * * *